Feb. 5, 1957 R. C. CARNECK 2,780,744
MOTOR BRUSH MOUNTINGS
Filed April 11, 1955 2 Sheets-Sheet 1

INVENTOR.
Robert C. Carneck
BY
ATTORNEYS

Feb. 5, 1957
R. C. CARNECK
2,780,744
MOTOR BRUSH MOUNTINGS
Filed April 11, 1955
2 Sheets-Sheet 2
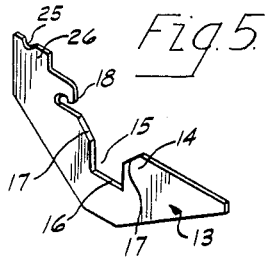
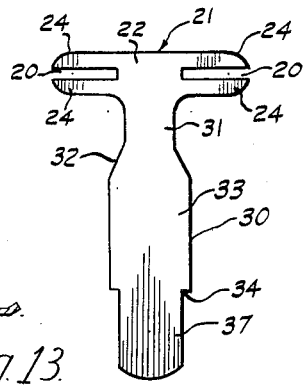
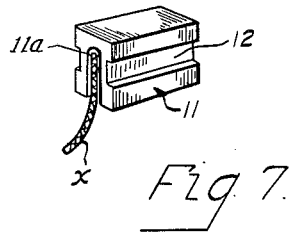
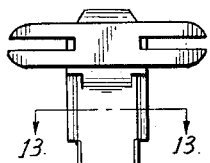
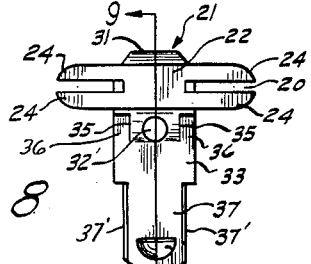
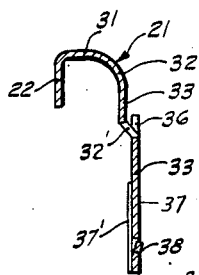
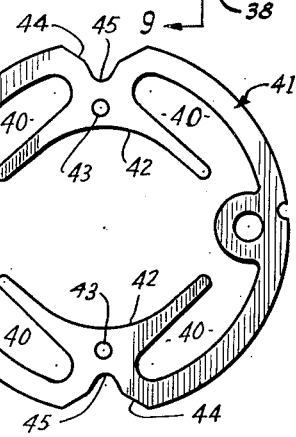
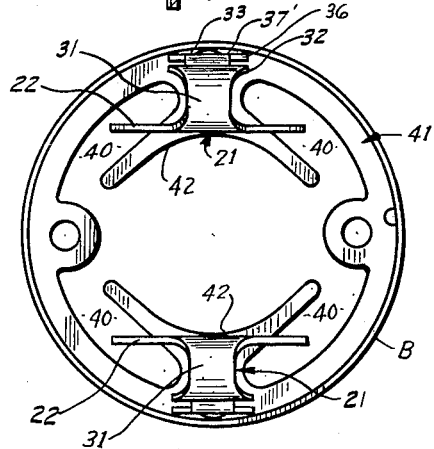
INVENTOR.
Robert C. Carneck
BY
Slough and Slough
ATTORNEYS

United States Patent Office 2,780,744
Patented Feb. 5, 1957

2,780,744

MOTOR BRUSH MOUNTINGS

Robert C. Carneck, Elyria, Ohio, assignor to The General Industries Company, Elyria, Ohio, a corporation of Ohio Application April 11, 1955, Serial No. 500,491

7 Claims. (Cl. 310—239)

My invention relates to improvements in motor brush mountings and relates more particularly to that type of mounting particularly adapted for use on the smaller fractional-horse power motors such as are commonly employed to drive automobile heater fans, although not limited thereto.

It is an object of my invention to provide brush mountings of the type referred to which will be simple to manufacture, having but few parts and these adapted for easy assembly into operative position.

Another object of my invention is to provide brush mountings of the type referred to which will securely hold the stator laminations in their stacked relationship and which brush mountings will be securely locked in engagement with the motor housing thus affording good support for the brush carriers.

A still further object of my invention is to provide brush mountings of the character described which will be inexpensive to manufacture and highly efficient in use.

Still further objects of my invention and the invention itself will become more readily apparent from a purview of the following description, in which description reference will be made to the accompanying drawings forming a part thereof, in which drawings:

Fig. 5 is a perspective view of one of a pair of like brush carriers;

Fig. 6 is a view of the blank from which the brush supports of my invention are constructed;

Fig. 7 is a perspective view of one of the pair of like motor brushes;

Fig. 8 is a front plan view of the brush supports of my invention after the blank of Fig. 6 is bent as described herein;

Fig. 9 is an end elevational view of the brush carrying support of Fig. 8 taken on the line 9—9 of Fig. 8;

Fig. 10 is a top plan view of a lamination of the stator of the motor of Figs. 1 to 3 inclusive;

Fig. 11 is a top plan view of the lamination of Fig. 9 in its assembled relationship with the brush carrying supports of Figs. 7 and 8;

Fig. 12 is a front plan view of a further embodiment of the brush supports of my invention, said view being similar to that of Fig. 8;

Fig. 13 is a sectional view of the brush support of Fig. 12, being taken on the line 13—13 of Fig. 12.

Figure 1:
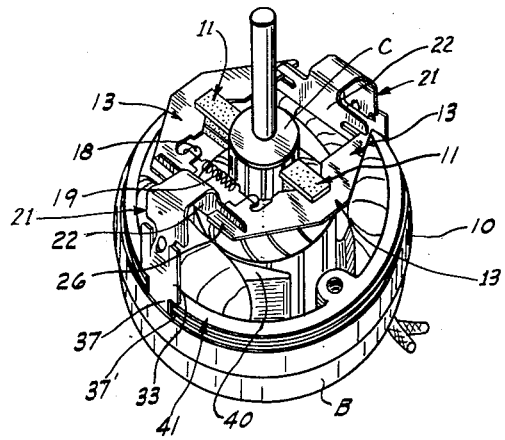
Fig. 1 is a perspective view of a motor with the uppermost end casing thereof removed, to which my brush mounting is shown as applied.

Referring now more particularly to the drawings, in all of which like parts are designated by like reference characters, at 10 I show a motor of conventional type, employing a pair of like brushes 11 which, as best shown in Fig. 7, are substantially H-shaped in transverse section, whereby longitudinal grooves 12 at their sides permit the brushes each to be slidingly fitted onto like brush carriers 13, as best shown in Fig. 5. Brush carrier portions 14 thereof bordering the side edges of a rectilinear notch 15 therein are adapted to loosely fit within the brush grooves 12 with the end surface of the brush which is inserted into the notch 15 disposed in engagement with the end wall 16 of the notch. It is to be noted that the brush carriers 13 are provided with entrant tapered faces 17 on either side of the notch 15 and with hook means 18, whereby tensile spring means 19 may be secured to said hook means of the oppositely disposed brush carriers to interconnect the same to exert spring tension thereon to hold both of the end portions 26 of the carriers 13 in pivotal engagement with the appropriate notches 20 of the brush mounting support members 21, as hereinafter described.

The carriers 13 are further provided with notches 25 in the end portions 26 thereof, said portions 26 being disposed in the notches 20 in the support members 21 and the notches 25 pivotally seating the web portions of the T-bar notches 20.

A "pig-tail" connector wire "x" is soldered, or otherwise connected, by an end to a convenient lateral surface portion of each brush 11 as at 11a.

The like pair of brush mounting support members 21, one of which is shown in Figs. 8 and 9 in its formed shape, the blank for the same being shown in Fig. 6, are preferably initially formed as a generally T-shaped flat strip of preferably case-hardened steel having a T-bar portion 22 provided with bifurcated ends providing like oppositely extending elongated notches 20, defined by end forks 24.

The stems 30 of the support members 21 are each preferably provided with a relatively narrow neck portion 31, a relatively wide body portion 33 joined to said neck portion 31 by downwardly and outwardly tapered side portions 32, and a tail portion 37 of slightly narrower width than said body portion 33 being integrally joined thereto by shoulder portions 34.

The neck 31 of the stem is generally bent at right angles to the T-bar, the tapered portions 32 are curved rearwardly and downwardly thereof, a circular opening 32' is provided centrally in an intermediate portion of the relatively wide body portion 33 and a pair of generally inverse L-shaped cuts 35 are provided on either side thereof; wherefor when the said centrally apertured portion 35' is angularly and outwardly disposed with respect to the vertically disposed upper portion of the relatively wide body portion 33. Lugs 36 are provided by said L-shaped cuts on either side thereof for a purpose later to be described herein.

The remainder of the portion 33 and body portion of the tail 37 vertically disposed and in spaced parallel relation to the T-bar 22 and the upwardly disposed portion 33.

The sides 37' of the tail 37 are then bent inwardly and at an oblique angle of approximately 30° to the body portion of the tail, as best shown in Figs. 2, 4, 9 and 11 and the tail is provided with an arcuate struck lip 38 for purposes later to be more fully described.

The support strips 21 are thus of generally hook shaped form and a pair of these are employed in the invention set forth herein, being assembled therewith as best shown in Figs. 1, 3, 4 and 11.

Figure 3:
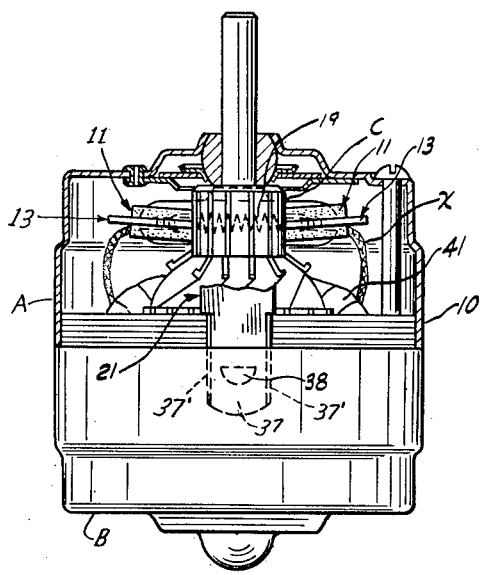
Fig. 3 is a side elevational view of an end portion of the motor, with the relatively enclosing portion of the casing being shown in diametrical section.
Figure 4:
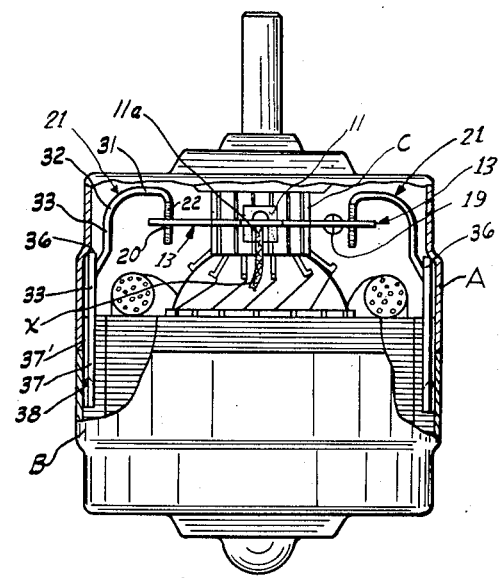
Fig. 4 is a view of the motor field structure of the motor of Figs. 1 to 3 inclusive, in diametrical section, said view being taken on the line 4—4 of Fig. 3.

In these figures it will be noted that the supports 21 are first inserted between a convenient passageway between the end casing B of the motor and the laminations 40 forming the stator core and, when so inserted, the struck out lip 38 of the tail and the lateral edges 37' thereof wedgingly engage portions of said end casing, as best illustrated in Figs. 3, 4 and 11.

The neck portion 31 is then disposed in spaced relation above the armature winding 41 and the T-bar is thereby disposed at right angles to the brush carriers 13 disposed on opposite sides of the centrally disposed commutator C, each of the brush carriers 13 being pivotally seated at either end within oppositely disposed slots 20 in the T-bars of a pair of the oppositely disposed support strips 21, the forks 24 defining said slots being disposed above and below the portions 26 of the carriers and the seat of the said slots 20 of one of said supports seating the notches 25 in the portions 26 at one end of the pair of carriers 13, as best shown in Fig. 1.

The tensile springs 19 are then expanded to interconnect the hooks 18 of the carriers 13 to ensure that the end portions 26 of both of the carriers are maintained in the appropriate notches 20 of the T-bar portions of the support strips 21.

After the carriers 13 are pivotally mounted about the supports 21, the strips wedgingly disposed in relative parallelism at respectively opposite sides of the commutator C, an upper end casing A is telescoped over the motor and the lugs 36 of the support strips 21 are wedgingly engaged with the sides thereof, as best shown in Fig. 4.

Figure 2:
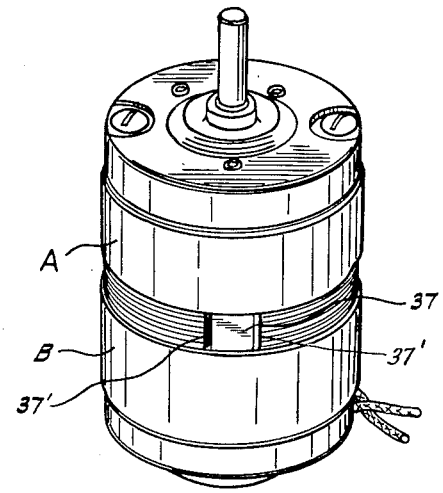
Fig. 2 is a perspective view of the motor of Fig. 1 showing the end casing being drawn over the end of the brush mounting and in contact therewith.

In use the support strips 21 of my invention are of generally inverted J-shaped form, the bar is disposed at right angles and downwardly from said neck portion and the tapered portion is disposed parallel to the end casing of the motor but inwardly thereof, the lugs 36 being adapted to be press fit into engagement with the end casing when the same is placed over the end of the motor, as best illustrated in Figs. 2, and the tail portion is adapted to be seated within generally V-shaped openings 45 in the laminations 41 forming the stator core.

As best shown in Fig. 10, the stator laminations are generally circular in form provided with pole leading faces 42, a pair of openings 43 and intermediate the rear of said pole faces, the laminations are provided with notches 44 in the outer periphery thereof formed by cutting a taper of 60° and then of 30° on either side of the notches 44 and providing a circular seat 45 therein. The tail portion and its inturned lateral side is seated within the tapered portion of greatest diameter of the laminations and the sides bear against the sides of such taper and against the motor casing.

To provide additional anchoring of the strips within the casing, the convex tab 38 of the tail 37 is adapted to tightly engage the lower casing when the strip is inserted between the outer surfaces of the stator laminations and motor casing.

It will be noted that with respect to the brush card support means 21 therefor, that these are anchored by wedging the same between the outside of the stator field and the inside of the cover in my present invention, and that the support is positioned in one direction by struckout portions that stop against the end of the field stack and in the other direction by butting against the inside end cover face, as shown in Fig. 4.

In the second embodiment of my invention shown in Figs. 12 and 13, it will be noted that the construction differs from that of the first embodiment herein illustrated and described by virtue of the addition of lateral inward projections 40 in the shank of the brush arm support 21 to position said support by wedging the same firmly between the field stack and the cover rather than by depending on the end of the support butting against the inner end of the cover, as aforesaid.

Although I have described my invention in connection with improved embodiments thereof, I am aware that numerous and extensive departures may be made therefrom, without however departing from the spirit of my invention and the scope of the appended claims.

I claim:

1. In combination, a motor casing formed of two cup-shaped casing parts, said parts extending respectively from opposite ends of the casing, a stator mounted within said casing with a gap between said stator and said casing, an armature rotatably mounted within said stator having a commutator extending outwardly axially beyond said stator, said commutator being at the top end of a vertically disposed motor shaft, a pair of brush carrier supports of generally inverted J-shaped form, each said support having a bar portion with bifurcated opposite ends, said bar portion being disposed at the loop end of the said J-shaped support, a stem portion integrally joined thereto and spaced therefrom by an arcuate neck portion integrally formed therewith, said stem being wedgingly disposed within the said gap between the motor casing and the stator, said stem provided with means adapted to butt against the lowermost casing part, and said support having additional means adapted to buttingly engage the uppermost casing part.

2. In combination, a motor casing formed of two cup-shaped casing parts, said parts extending respectively from opposite ends of the casing, one part being an uppermost casing part and the other being a lowermost casing part, a stator consisting of a plurality of stator laminations mounted within said casing, an armature rotatably mounted within said stator having a commutator extending outwardly, axially beyond said stator, said commutator being at the top end of a vertically disposed motor shaft, a pair of brush carriers, a pair of brush carrier supports of generally inverted J-shaped form, each said support having a bar portion provided with bifurcated opposite ends, said bar portion being disposed at the loop end of the said J-shaped support, said brush carriers each having opposite end portions adapted to respectively seat between the slot defined by the forks of one end portion of different of said bifurcated bars, the carriers of said pair being relatively disposed at opposite sides of the commutator in substantial parallelism, and said carriers and bars together forming a quadrilateral jointed structure surrounding the commutator, a commutator brush carried by each carrier extending inwardly towards and interspacing its associated carrier from said commutator and spring means yieldably exerting pressure on said carriers, said supports each having a stem portion spaced in a substantial parallel plane with each said bifurcated bar portion of said supports, said supports each having a neck portion of substantially relatively narrow extent disposed at generally right angles to said bifurcated portion and a stem interconnecting portion of relatively greater width than said neck portion, said stem having a pair of upwardly disposed lugs on either side outwardly projecting from said stem interconnecting portion, said supports each being provided with a tail portion having means provided therein adapted to wedgingly engage the lowermost said casing part and said lug portions of said stem adapted to wedgingly engage the uppermost casing part.

3. In combination, a motor casing formed of two cup-shaped casing parts, said parts extending respectively from opposite ends of the casing, one part being an uppermost casing part and the other being a lowermost casing part, a stator consisting of a plurality of stator laminations mounted within said casing, an armature rotatably mounted within said stator having a commutator extending outwardly, axially beyond said stator, said commutator being at the top end of a vertically disposed motor shaft, a pair of brush carriers, a pair of brush carrier supports of generally inverted J-shaped form, each said support having a bar portion provided with bifurcated opposite ends, said bar portions being disposed at the loop end of the said J-shaped support, said brush carriers each having opposite end portions adapted to respectively seat between the slot defined by the forks of one end portion of different of said bifurcated bars, the carriers of said pair being relatively disposed at opposite sides of the commutator in substantial parallelism, and said carriers and bars together forming a quadrilateral jointed structure surrounding the commutator, a commutator brush carried by each carrier extending inwardly towards and interspacing its associated carrier from said commutator and spring means yieldably exerting pressure on said carriers, said supports each having a stem portion spaced in a substantial parallel plane with each said bifurcated bar portion of said supports, said supports each having a neck portion of substantially relatively narrow extent disposed at generally right angles to said bifurcated portion and a stem interconnecting portion of relatively greater width than said neck portion, said stem having a pair of upwardly disposed lugs on either side outwardly projecting from said stem interconnecting portion, said supports each being provided with a tail portion having means provided therein adapted to wedgingly engage the lowermost said casing part and having lateral edges disposed being outwardly tapered with respect to the remainder of the tail portion, said edges also engaging portions of said lowermost end casing part and said lug portions of said stem adapted to wedgingly engage the uppermost casing part.

4. In combination, a motor casing formed of two cup-shaped casing parts, said parts extending respectively from opposite ends of the casing, a stator consisting of a plurality of stator laminations mounted within said casing, an armature rotatably mounted within said stator having a commutator extending outwardly axially beyond said stator, said commutator being at the top end of a vertically disposed motor shaft, a pair of brush carrier supports of generally inverted J-shaped form, each said support having a bar portion with bifurcated opposite ends, said bar portion being disposed at the loop end of the said J-shaped support, a stem portion integrally joined thereto and spaced therefrom by an arcuate neck portion integrally formed therewith, each of the stator laminations being provided with a pair of generally V-shaped notches adjacent the outer periphery, said notches providing a gap between said stator and said casing parts, said support being seated within said gap, said support being provided with means whereby the same is wedgingly engaged with the casing wherefore the supports are lockingly engaged in their seated relation between said casing and said stator laminations and provides a firm pivot for the brush carriers pivotally carried thereby.

5. In combination, a motor casing formed of two cup-shaped casing parts, said parts extending respectively from opposite ends of the casing, one part being an uppermost casing part and the other being a lowermost casing part, a stator consisting of a plurality of stator laminations mounted within said casing, an armature rotatably mounted within said stator having a commutator extending outwardly, axially beyond said stator, said commutator being at the top end of a vertically disposed motor shaft, a pair of brush carriers, a pair of brush carrier supports of generally inverted J-shaped form, each said support having a bar portion provided with bifurcated opposite ends, said bar portion being disposed at the loop end of the J-shaped support, said brush carriers each having opposite end portions adapted to respectively seat between the slot defined by the forks of one end portion of different of said bifurcated bars, the carriers of said pair being relatively disposed at opposite sides of the commutator in substantial parallelism, and said carriers and bars together forming a quadrilateral jointed structure surrounding the commutator, a commutator brush carried by each carrier extending inwardly towards and interspacing its associated carrier from said commutator and spring means yieldably exerting pressure on said carriers, said supports each having a stem portion spaced in a substantial parallel plane with each said bifurcated bar portion of said supports, said supports each having a neck portion of substantially relatively narrow extent disposed at generally right angles to said bifurcated portion and a stem interconnecting portion of relatively greater width than said neck portion, outwardly disposed portions of the interconnecting portion adapted to wedgingly engage the uppermost said casing part and portions of the said tail portion adapted to wedgingly engage the lowermost casing part.

6. In combination, a motor casing formed of two cup-shaped casing parts, said parts extending respectively from opposite ends of the casing, a stator consisting of a plurality of stator laminations mounted within said casing, an armature rotatably mounted within said stator having a commutator extending outwardly axially beyond said stator, said commutator being at the top end of a vertically disposed motor shaft, a pair of brush carrier supports of generally inverted J-shaped form, each said support having a bar portion with bifurcated opposite ends, said bar portion being disposed at the loop end of the said J-shaped support, a stem portion integrally joined thereto and spaced therefrom by an arcuate neck portion integrally formed therewith, each of the stator laminations being provided with a pair of pole leading faces and a pair of generally V-shaped notches adjacent the outer periphery, a pair of motor field coils, each of said coils being wound about one of said pole leading faces, said notches providing a gap between said stator and said casing parts, said support being seated within said gap, said support being provided with means whereby the same is wedgingly engaged with the casing wherefore the supports are lockingly engaged in their seated relation between said casing and said stator laminations and provides a firm pivot for the brush carriers pivotally carried thereby.

7. In combination, a motor casing formed of two cup-shaped casing parts, said parts extending respectively from opposite ends of the casing, one part being an uppermost casing part and the other being a lowermost casing part, a stator consisting of a plurality of stator laminations mounted within said casing, an armature rotatably mounted within said stator having a commutator extending outwardly axially beyond said stator, said commutator being at the top end of a vertically disposed motor shaft, a pair of brush carrier supports of generally inverted J-shaped form, each said support having a bar portion with bifurcated opposite ends, said bar portion being disposed at the loop end of the said J-shaped support, a stem portion integrally joined thereto and spaced therefrom by an arcuate hook portion integrally formed therewith, each of the stator laminations being provided with a pair of pole leading faces and a pair of generally V-shaped notches adjacent the outer periphery, a pair of motor field coils, each of said coils being wound about one of said pole leading faces, said notches providing a gap between said stator and said casing parts, said support being seated within said gap, said support being provided with means whereby the same is wedgingly engaged with the casing wherefore the supports are lockingly engaged in their seated relation between said casing and said stator laminations and provides a firm pivot for the brush carriers pivotally carried thereby, said support having a relatively narrow tail portion, said tail portion being provided with an outwardly extending lip, said outwardly extending lip portion of the tail being adapted to lockingly seat the support with the lowermost casing part and said support being provided with a pair of lugs in the uppermost portion of said stem adjacent the neck portion of said support, said lugs being adapted to engage the uppermost casing to wedgingly engage the same therewith.

References Cited in the file of this patent

UNITED STATES PATENTS

| | | |
|---|---|---|
| 2,504,564 | Merriam | Apr. 8, 1950 |
| 2,668,924 | Merriam | Feb. 9, 1954 |